DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED NOVEMBER 4, 1975

940 O.G. 7

T940,010
EDIBLE EMULSIFIERS AND PROCESS FOR MAKING SAME

William J. Simcox, 2460 Wildwood Drive, Kingsport, Tenn. 37660

Filed May 24, 1974, Ser. No. 473,105
**Int. Cl. A21d *2/16***
U.S. Cl. 426—62
No Drawing. 18 Pages Specification

Finely divided edible emulsified compositions having resistance to foaming when used in bread mixes and which are also resistant to lumping, caking and dusting are prepared by incorporating a small amount of animal fat or vegetable oil into a finely divided emulsifier. The preferred emulsifiers are succinylated monoglycerides.